United States Patent [19]
Mohan et al.

[11] Patent Number: 5,425,137
[45] Date of Patent: Jun. 13, 1995

[54] SYSTEM AND METHOD FOR PROCESSING IMAGES USING COMPUTER-IMPLEMENTED SOFTWARE OBJECTS REPRESENTING LENSES

[75] Inventors: Sudhir Mohan, Santa Clara; Yusuke Ishii, Cupertino; Saisatyanarayana R. Gadiraju, Sunnyvale; Sudhir R. Parikh, Santa Clara, all of Calif.

[73] Assignee: US JVC Corporation, N.J.

[21] Appl. No.: 9,547

[22] Filed: Jan. 26, 1993

[51] Int. Cl.$^6$ .............................................. G06F 15/62
[52] U.S. Cl. .................... 395/133; 395/125; 395/155; 395/157; 395/161
[58] Field of Search ............ 395/133, 135, 139, 118, 395/119, 125, 127, 128, 155, 157, 161, 162; 340/705, 734, 747; 345/113, 114, 115, 119, 120

[56] References Cited

U.S. PATENT DOCUMENTS

| | | | |
|---|---|---|---|
| H997 | 11/1991 | Bronson | 340/747 X |
| 4,763,280 | 8/1988 | Robinson et al. | 340/705 X |
| 4,862,388 | 8/1989 | Bunker | 340/747 X |

*Primary Examiner*—Almis Jankus
*Attorney, Agent, or Firm*—Albert C. Smith

[57] ABSTRACT

A system and method for processing images employs virtual lens objects as image processing elements in a computer-implemented scheme. Each lens object represents one or more image processing operations defined by user-specified lens attributes. The operations may simulate actual physical lens behavior, or they may be abstract operations with no real-world analogs. The user may specify various types of operations for each lens object, and may add, delete, and modify lens objects and lens attributes to experiment with various configurations. The system and method apply the lens objects to a source image to produce a transformed image for output on a screen or printing device.

31 Claims, 18 Drawing Sheets

SYSTEM AND METHOD FOR PROCESSING IMAGES USING COMPUTER-IMPLEMENTED SOFTWARE OBJECTS REPRESENTING LENSES

BACKGROUND OF THE INVENTION

1. Field of the Invention

This invention relates to image processing technologies and, more particularly, to an image processing system and method employing user-configurable virtual objects representing lenses.

2. Description of the Related Art

Conventional image processing systems perform user-selectable operations and transformations on a source image to produce a transformed image. Such systems may be implemented using conventional computer hardware and software. Referring now to FIGS. 2A, 2B, and 2C, there is shown an example of typical operation of a conventional image processing system. Display field 201 is shown in all three figures, containing an image at three different points in time. Initially, source image 202 is provided to the computer in the form of a bitmap containing an array of pixel data. This pixel data defines a color and intensity value for each pixel in display field 201. Under the control and direction of image processing software, a conventional system performs operations on the pixel data in accordance with user specification. The transformed bitmap of pixel data is then output as a transformed image.

In the example shown, a user specifies three transformations. Referring now to FIG. 2B, the results of two transformations are shown: region 204 has been skewed, and region 205 has been darkened by the addition of random pixels at a specified density. The resulting image 203 is shown in display field 201.

Referring now to FIG. 2C, there is shown resulting image 206 after a third transformation. Here, region 207 has been flipped vertically. Significantly, region 207 overlaps both regions 204 and 205, so that the order of application of the three transformations affects the outcome. Techniques for performing such operations, either sequentially or concurrently, are well known in the image processing art, and may be implemented by any of several commercially available software packages. In many such software packages, a large number of sophisticated image processing operations are available and successively selectable by the user.

One disadvantage of conventional image processing systems is that the user's ability to experiment with different configurations of operations is limited. As each operation is performed on the image, the operation becomes subsumed into the image content itself. Reversing or altering a previously performed operation is not usually possible, particularly if subsequent operations have been performed in the interim. Thus, in the example of FIGS. 2A, 2B, and 2C, the user is not able directly to alter the order of application, or the particular characteristics, of each of the three transformations, after they have been applied. Although some systems provide means by which a user may "undo" an operation, or save a previous state of the image, they do not provide complete flexibility in manipulating previously applied operations. Thus, experimentation is cumbersome.

SUMMARY OF THE INVENTION

In accordance with the present invention, there is provided a system and method for processing images wherein operations to be performed on the source image are defined in terms of a plurality of virtual lens objects, or "lenses". Each lens object represents one or more operations that are defined by user-specified lens attributes. One such attribute specifies the region of operation of the lens. Other lens attributes specify the type and magnitude of operations to be performed on the underlying image within the defined region of the lens. These operations may simulate actual physical lens behavior (such as enlarging or distorting the image) or they may be more abstract (such as making a color image black-and-white).

The user may specify any number of operations for a given lens object. Furthermore, the user may specify any number of lens objects to operate on a given image. The regions of operation may or may not overlap one another. Lens objects are applied to the image in a user-specified order, so that overlapping lens objects form a virtual stack. When lens regions overlap one another, the transformed image that results from application of the first (or lowest level) lens becomes input for subsequent (higher level) lenses. Thus, as in a stack of real, physical lenses, lens operations are cumulative.

By encapsulating image processing operations in discrete lens objects, the system of the present invention provides improved flexibility. The user may add, remove, or edit lenses at any desired level and in any desired sequence. Furthermore, a user interface may be provided by which user manipulation of lens objects resembles actual physical manipulation of real-life lenses. Thus, the system of the present invention facilitates implementation of an intuitive metaphor to a physical system to simplify operation and improve ease of use.

DESCRIPTION OF THE PREFERRED EMBODIMENT

Figure 1:
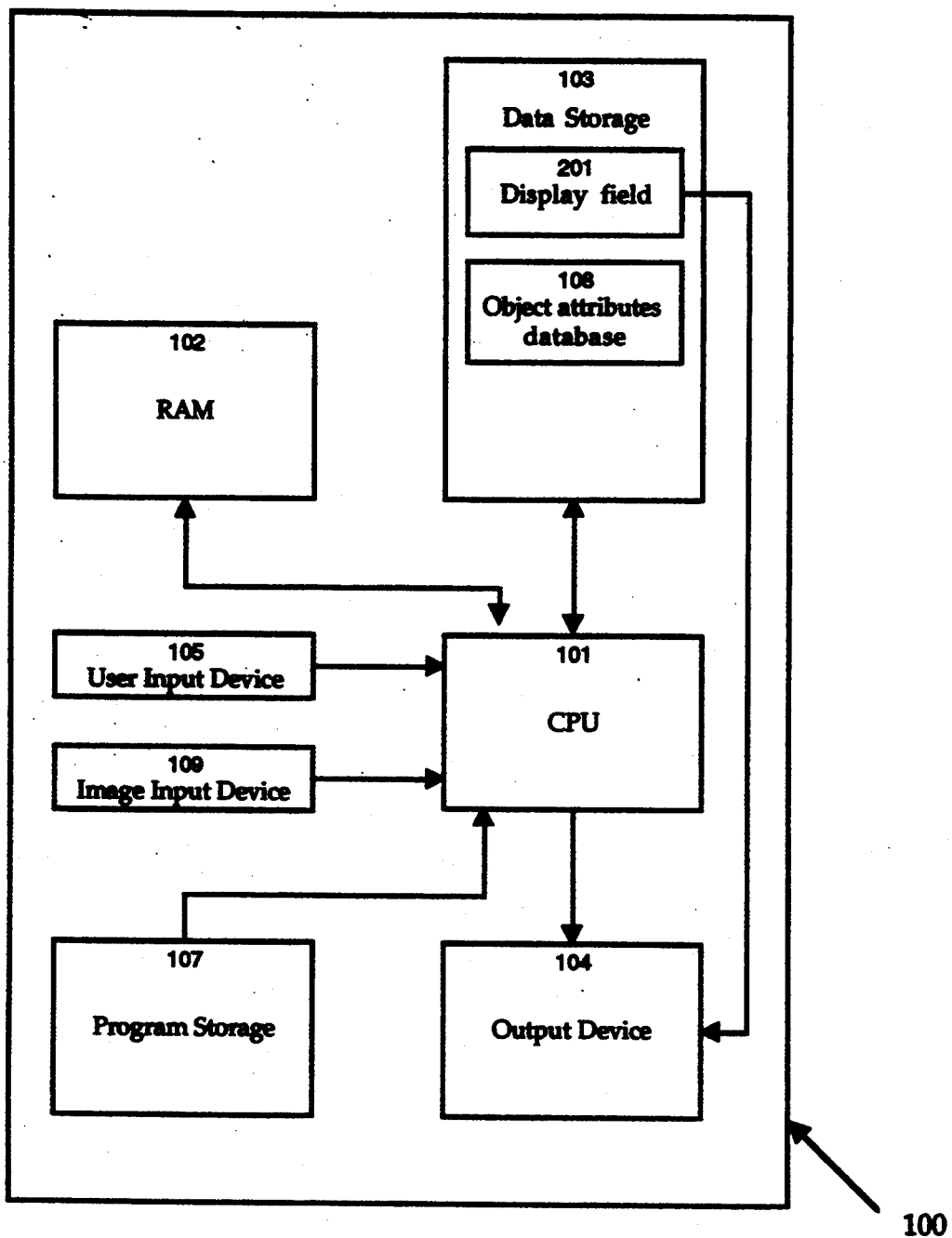
FIG. 1 is a block diagram of an implementation of the present invention.
Figure 2A:
FIGS. 2A, 2B, and 2C are examples of conventional image processing techniques as implemented in the prior art.
Figure 2B:
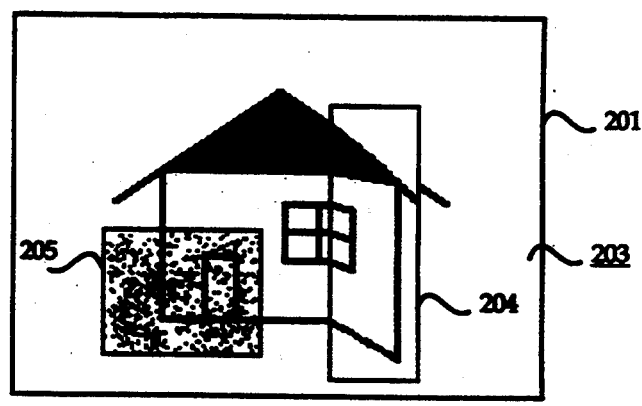
Figure 2C:
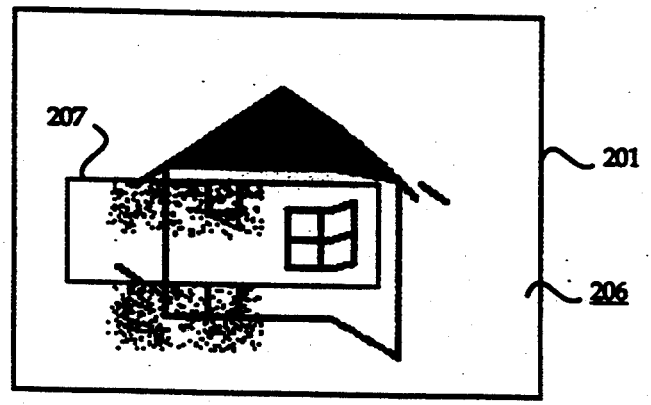

Referring now to FIG. 1, there is shown a block diagram of the hardware elements of a typical implementation of image processing system 100 in accordance with the present invention. Source images may be supplied to system 100 using one or more image input devices 109 (such as a video camera, scanner, or the like), or may be read from data storage 103 (such as a disk). The user may supply commands to system 100 via one or more user input devices 105 (such as a keyboard and/or mouse). Central processing unit (CPU) 101 runs software program instructions, stored in program storage 107, which direct CPU 101 to perform the various functions of system 100. Data storage 103 may contain a representation of display field 201, as well as a database 108 containing object attributes and other data.

The inventive aspects of the present invention lie primarily in the software instructions that control the hardware elements shown in FIG. 1. In accordance with these software instructions, CPU 101 accepts user input from user input device 105, accepts image input from image input device 109, accesses data storage 103, and uses random access memory (RAM) 102 (and particularly display field 201) in a conventional manner as a workspace, to process images and generate output on output device 104. It has been found preferable to implement system 100 according to an object-oriented software environment such as the C++ programming language.

In the embodiment illustrated herein, CPU 101 can be a mainframe computer or a powerful personal computer or workstation; RAM 102 and data storage 103 are conventional RAM, read-only memory (ROM) and disk storage devices for the CPU; user input device 105 is a conventional keyboard and/or mouse; image input device 109 is a video camera with associated apparatus for converting a video image into a bitmap; and output device 104 is a conventional means for either displaying or printing processed images, or sending the processed images to processed image storage (not shown) for later viewing. The preferred embodiment operates on still images, but the techniques and concepts disclosed herein could be applied to moving images without departing from the spirit or essential characteristics of the present invention.

Figure 3:
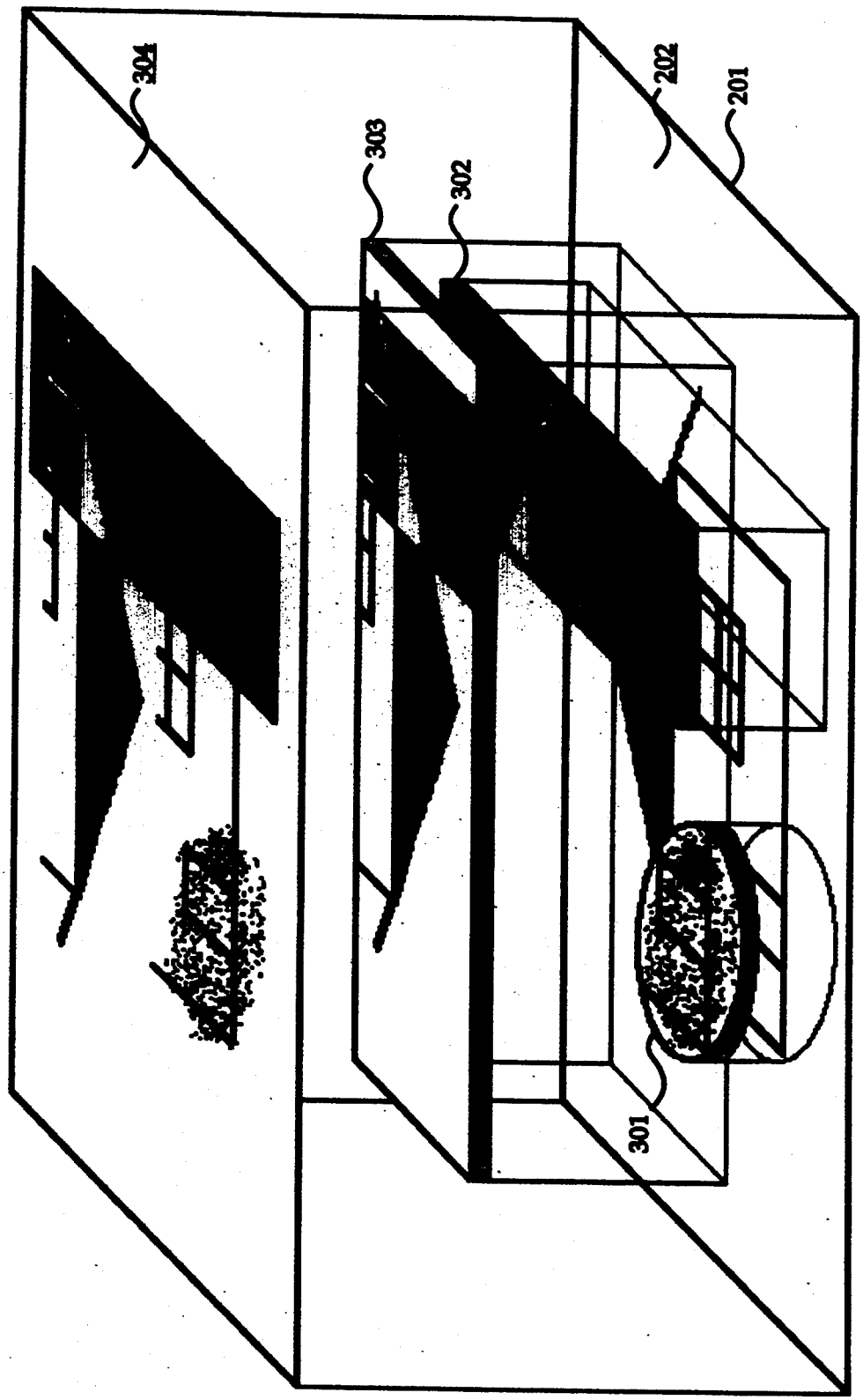
FIG. 3 is a conceptual representation of an example of the image processing technique of the present invention.

Referring now to FIG. 3, there is shown a conceptual representation of the operation of system 100 according to the present invention. Display field 201 contains source image 202 that is to be processed. Source image 202 may be provided to the system according to any desired format. In the preferred embodiment, images comprise spatially correlated pixel data, or "bitmaps", according to techniques known in the art. In the particular example of FIG. 3, three virtual lens objects 301, 302, 303 are applied to source image 202 in succession. Lens objects are not physical lenses, but rather they are stored software objects in an object-oriented software environment. Each lens has a number of attributes. The user may change the attributes of any of the lenses at will, or he or she may add new lenses and delete old ones, as will be described below. Thus, system 100 provides improved flexibility in processing images, as the user may try out various combinations of lenses with ease.

In the example of FIG. 3, lens object 301 darkens an oval portion of the image, lens object 302 inverts pixels in a rectangular portion of the image, and lens object 303 flips another rectangular portion of the image. Note that the region of operation of lens object 303 overlaps that of lens object 302, so that a portion of the flipped image produced by lens object 303 has inverted pixels. The lenses are applied in the specific order: lens 301, then lens 302, then lens 303. Due to the overlap, changing the order of application of lens objects 302 and 303 would result in a different transformed image 304.

The final transformed image 304 is made up of the output of each of lenses 301, 302, 303 where those lenses operate on source image 202. Where no lenses operate, transformed image 304 is identical to source image 202. The preferred embodiment uses spatially correlated pixel data to represent both source image 202 and transformed image 304, although any image representation scheme may be used.

Figure 4:
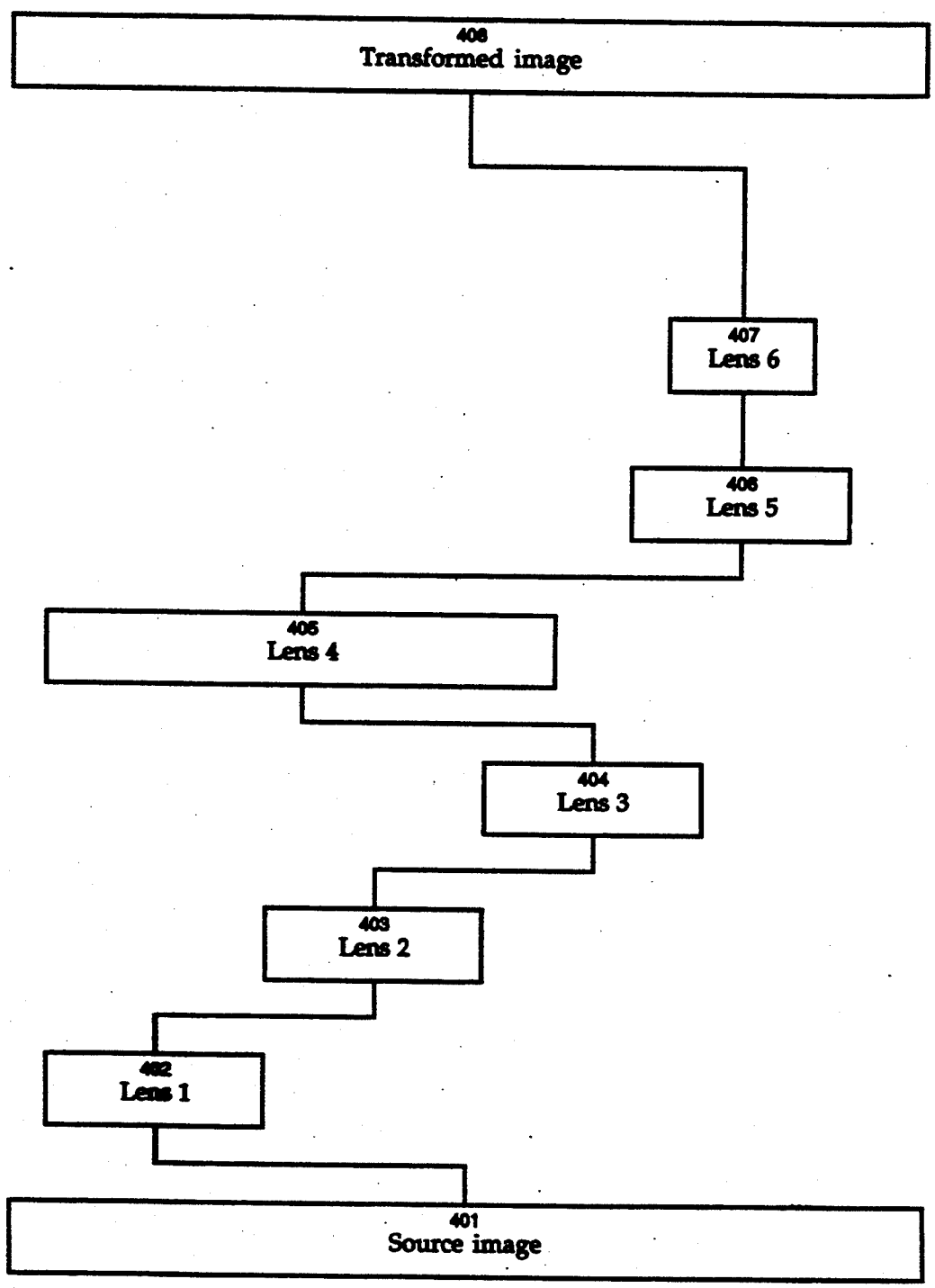
FIG. 4 is a block diagram showing a sample lens object configuration.

Referring now to FIG. 4, there is shown a block diagram of a sample configuration including six stacked lenses 402–407. The lenses operate on source image 401 to produce transformed image 408. As shown in FIG. 4, the order of operation of the lenses is defined by the placement of the lenses in a vertical stack. Additionally, the region of operation for each lens is defined by its horizontal position with reference to source image 401. Thus, lens 4 overlaps lenses 1, 2, and 3; since lens 4 is higher in the stack than lenses 1, 2, and 3, lens 4 will operate on the output of each of the lower-level lenses. Because of the particular positioning of the lenses in this example, lens 4 will operate on a portion of the lens 3 output, as well as on the entirety of the lens 1 and 2 output. Similarly, lens 5 will operate on a portion of the lens 3 output, and lens 6 will operate on a portion of the lens 5 output. Transformed image 408 is then defined as a combination of source image 401, and outputs of lenses 3, 4, 5, and 6. Should the user elect to move any of the lenses, the operation described above may change.

Lens Object Attributes

It will be apparent to those skilled in the art that many different lens object attributes may be provided without departing from the invention as herein claimed. Such lens object attributes may include analogs to real-world lens attributes (such as color filter, magnification, and the like), as well as attributes having no real-world counterparts (such as pixel inversion). If desired, lens object attributes may even vary with time according to a user-defined function. Examples of lens object attributes in the preferred embodiment include:

Region of Operation: This attribute defines the area to which the lens object's operations are applied. The user defines the lens object's region of operation by conventional interactive drawing means, such as geometrical shape-drawing tools, path tools, or brush tools. Thus, the region may be defined in terms of a location and defined shape, or it may be defined by an arbitrary bitmap specified by applying a series of conventional paint operations. Alternatively, the user may specify that the region perimeter be defined by some search criteria, such as color matching. If so, the user may specify a topological constraint to grow contiguously from a defined path. Regions may have disjoint areas, as well as "holes".

The user may change the region of operation of existing lens objects by conventional interactive drawing means. Thus, those regions that were defined by geometrical shapes may be scaled, distorted, or otherwise modified. Those regions defined by brush tools may be changed by applying brush tools to the region definition. If the user moves the lens object (for example, by "dragging" a representation of the lens object using a conventional pointing device), the region of operation the lens object moves accordingly. The specific methods by which the user may specify and modify the region of operation are described below, in connection with FIGS. 12 and 13.

Image Processing Operation: This attribute defines some form of operation to be performed on the source image within the area defined by the lens region. Several such operations may be specified for each lens object, and the order of their application may also be specified. Typical image processing operations may include magnification, pixel inversion, and the like. Such transformations are well known to those skilled in the art.

Pixel Data Specification: This attribute defines a bitmap representing image data associated with the region of the lens object. This bitmap may be defined by copying a portion of the source image, or by applying a series of conventional paint operations. Several such pixel data layers may be provided for a lens object, and the order of application of multiple layers may be selected by the user. Pixel data specification may be thought of as a special case of image processing operation whose effect is to apply pixel data to the source image in the region of the lens object. The pixel data is applied to the source image in a manner defined by the region blending specification, described below. The area of effect of the pixel data specification is limited by the region of operation of the lens object, so that the lens object is incapable of affecting any part of the image lying outside its region of operation.

Region Blending Specification: For each layer of pixel data, this attribute defines a manner and degree of blending, or combination, between the pixel data and the underlying source image within the region. For example, for a lens having a pixel data specification,-the region blending specification may specify a degree of transparency for the pixel data bitmap, or it may specify that the pixel data is to be blended with whatever lies beneath in a particular manner. On the other hand, for a lens having an image processing operation, the region blending specification may specify the intensity of the image processing operation to be applied to the source image. Several region blending specifications may be provided for each lens object, so that multiple blending operations may be performed. In addition, region blending specifications may be defined by reference to an opacity spread, as described below, thus allowing the degree of transparency or intensity to vary within the lens object.

Region Edge Blending Specification: This attribute defines a degree of blending between the pixel data of the lens object and the source image around the bounds of the region. Edge blending produces a gradual effect at the borders of each lens region, to soften the boundary transition to a specified degree.

Opacity Spread: This attribute specifies a manner of application of a given image processing operation. An opacity spread area may be specified by the user, along with a gradient or other function. The function, delimited by the opacity spread area, is used to vary the degree of application of the given operation. The opacity spread area may or may not coincide with the region of operation of the lens object; if the opacity spread area does not coincide with the region, the region of operation limits the area of application of the opacity spread.

Figure 10A:
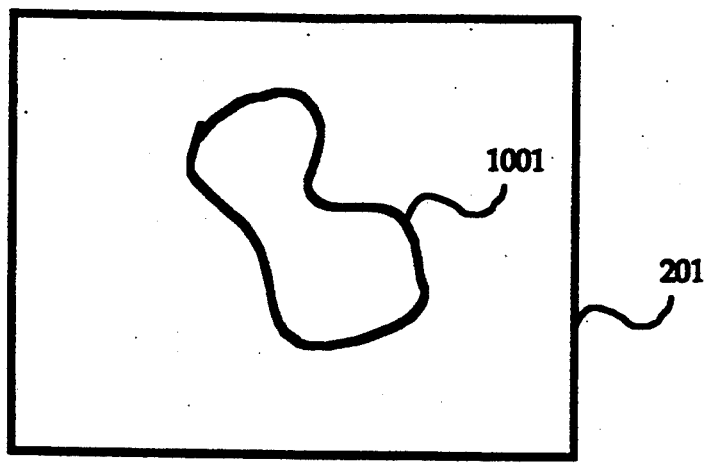
FIGS. 10A, 10B and 10C show an example of an opacity spread according to the present invention.
Figure 10B:
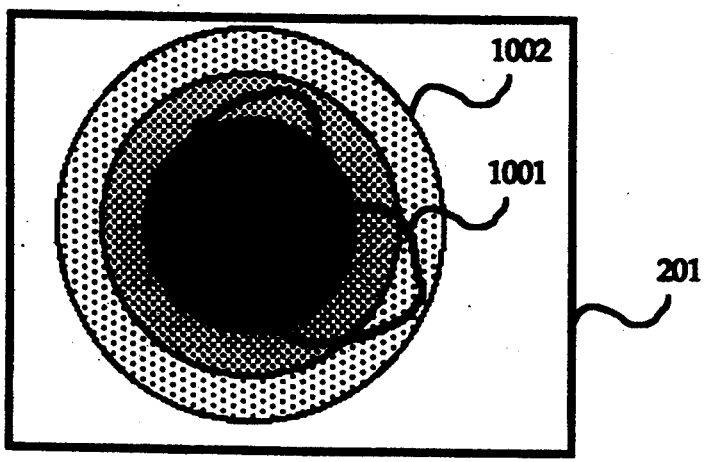
Figure 10C:
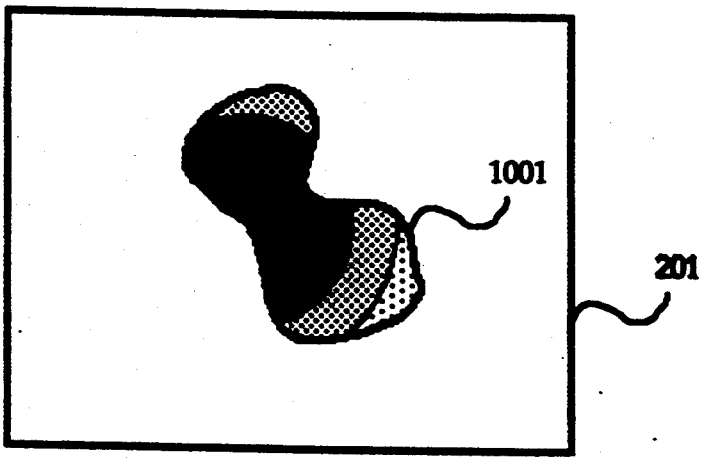

Referring now to FIG. 10A, for example, the user may specify a lens object 1001 having a region of operation defined by an arbitrary shape. As one of the operations of the lens object, the user may specify that the image be darkened within the region of operation (see "Image Processing Operation", above). The user may specify a varying degree of application of this operation by specifying an opacity spread area. Referring now to FIG. 10B, the user may specify a circular opacity spread area 1002, with opacity varying from 10% at the outer edge of the circle to 100% at its center. (For purposes of illustration, FIG. 10B shows opacity variations as a series of discrete bands. The actual invention may implement either a continuous opacity gradient or a series of bands, depending on the user's specification). Thus, the image will be darkened 100% at the center of the circle (which may or may not coincide with the center of the region of operation of the lens), while the degree of darkening lessens as one moves away from the center. The theoretical lower bound of the degree of darkening is 10% (at the outer edge of the circle). However, since the outer edge of the circle is outside the periphery of the region of operation of the lens object, that portion of the image lying outside the lens object's region of operation is not affected by the lens object. Thus, the final result of the lens object is shown in FIG. 10C.

The user may specify that the opacity spread be "contour-fitted", in which case it exactly coincides with the region of operation of the lens. Alternatively, the user may specify any type of opacity spread, with gradients and other variance functions as desired. Also, the opacity spread definition may be applied to any type of lens operation having varying degrees of effect (such as blurring, coloring, and the like).

Secondary Mask: A secondary mask defines a geographic area within which image processing operations of lenses stacked underneath will not take effect. Thus, the secondary mask blocks out lens effects within a defined area. When a lens is moved, its secondary mask does not move with it, unless the user specifies that the secondary mask is to be moved.

Figure 15A:
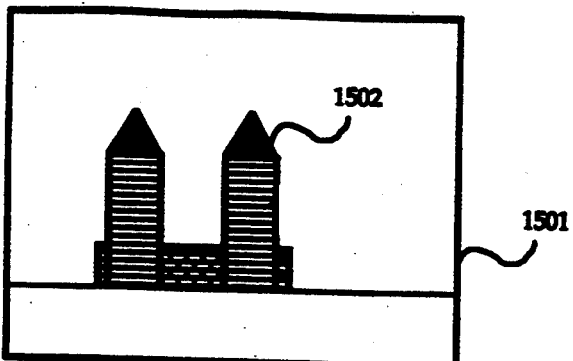
FIGS. 15A, 15B, 15C, and 15D show an example of a secondary mask according to the present invention.
Figure 15B:
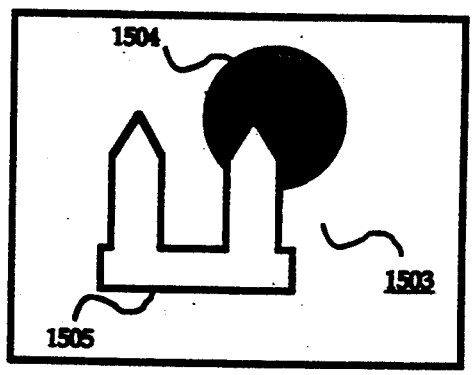
Figure 15C:
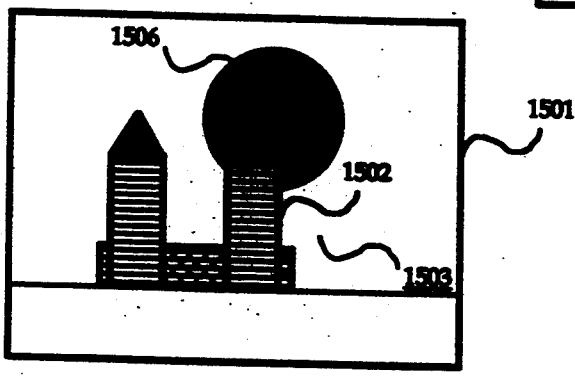
Figure 15D:
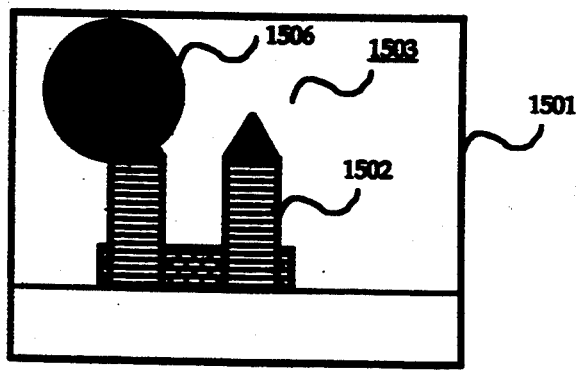

A secondary mask is useful when a lens effect is to appear "behind" an existing image. Referring now to FIGS. 15A through 15D, there is shown an example of a secondary mask. In FIG. 15A, there is shown an existing image 1501 containing building 1502. In FIG. 15B, there is shown a lens definition for a lens 1503 having a circular region of operation 1504 and a secondary mask definition 1505 matching the shape of building 1502. In FIG. 15C, lens 1503 is applied to existing image 1501 to produce a representation of the moon 1506 behind building 1502. In FIG. 15D, lens 1503 is moved to the left. Since secondary mask definition 1505 does not move when lens 1503 moves, the moon 1506 still appears to be behind building 1502. Thus, the user can freely move lens 1503 (representing the moon 1506), and secondary mask definition 1505 preserves the illusion of building 1502 being in front of the moon 1506.

A secondary mask blocks out lens effects only for those lenses lying beneath the mask. Thus, if a new lens were created on top of lens 1503, it would not be blocked out by the secondary mask, and would appear to be in front of the building.

To summarize then, a lens object may possess four distinct geographic areas: 1) a region of operation defining the outer perimeter of effect of the lens; 2) for each image processing operation of the lens, an area within which that operation will take effect; 3) an opacity spread area; and 4) an independently movable secondary mask defining an area within which the lens will not have effect. These four geographic areas serve different functions, and they may or may not coincide with one another for a given lens object.

Figure 11:
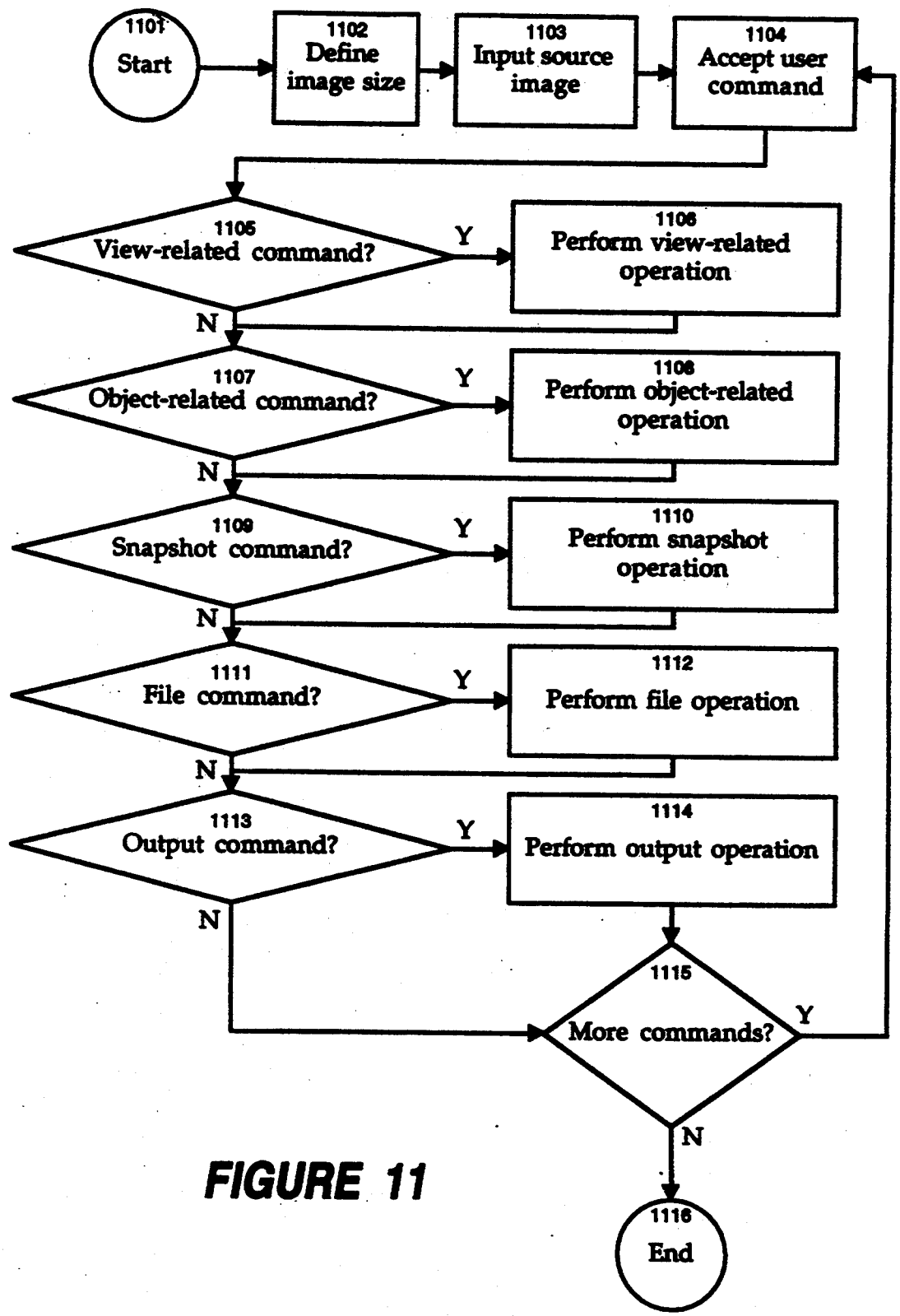
FIG. 11 is a flowchart showing overall operation of the present invention.

Referring now to FIG. 11, there is shown a flowchart of the method of operation of the preferred embodiment of the present invention. First, the user defines 1102 the image size to be worked on. Then, source image 401 is supplied 1103 to system 100 via image input device 109. Then, system 100 accepts 1104 user input via user input device 105. This user input specifies the types of operations the user wishes to perform to transform source image 401. The user specifies the operations in terms of lens objects. By specifying and modifying attributes for each of the lens objects, the user causes system 100 to perform various transformations on the image.

The user may specify one of several primary types of commands. If the user specifies 1105 a view-related command, system 100 performs 1106 the corresponding view-related operation. Such operations are known in conventional drawing programs, and may include scrolling, zooming in or out, and changing the size of a window.

If the user specifies 1107 an object-related command, system 100 performs 1108 the corresponding object-related operation. Object-related operations include manipulation of both lenses and conventional (non-selectable) objects, as described below in connection with FIGS. 12 and 13.

If the user specifies 1109 a snapshot command, system 100 performs 1110 the corresponding snapshot operation. Snapshot operations are described below in connection with FIG. 14.

If the user specifies 1111 a file command, system 100 performs 1112 the corresponding file operation. Such operations are known in conventional drawing programs, and may include opening, saving, deleting, or otherwise manipulating a file.

If the user specifies 1113 an output command, system 100 performs 1114 the corresponding output operation. Such operations typically involve out-putting transformed image 408 on output device 104 according to conventional techniques.

Other commands and associated operations, such as library commands, help commands, and the like, are known in the art and may be included.

After performing the indicated operations, system 100 checks 1115 to see if there are any more commands from the user. If so, it repeats steps 1104 to 1114 as appropriate. The process of specifying attributes for lens objects and viewing the resulting transformed image is interactive, so that the user may experiment with several different combinations of lens objects and attributes, and see the results of each combination.

Figure 12:
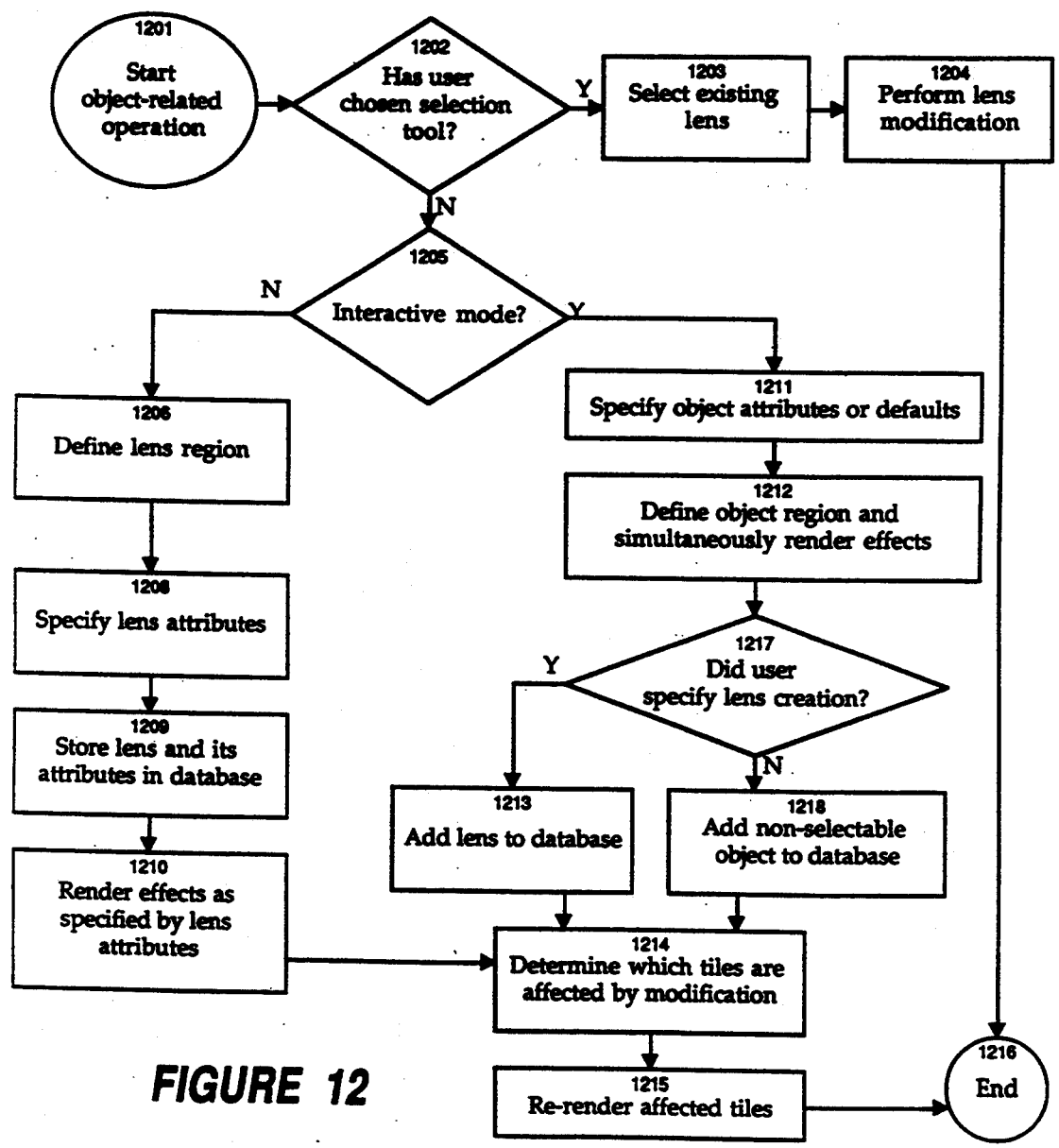
FIG. 12 is a flowchart showing an object-related operation of the present invention.

Referring now to FIG. 12, there is shown a flowchart of an object-related operation of the preferred embodiment. The user invokes this operation by specifying an object-related command. Typically, this is done by selecting a particular type of tool from an on-screen tool palette, in a manner that is well known in the art. The user may choose a "selection" tool, which allows him or her to make changes to an existing lens, or he or she may choose a "drawing" tool, which allows him or her to create either a new lens or a conventional drawn object (also known as a non-selectable object). Several types of drawing tools may be available, such as a line tool, a curve tool, a circle tool, a rectangle tool, and the like. In the preferred embodiment, these drawing tools may also be used to perform conventional drawing operations, as would be performed with typical computer-implemented drawing programs. System 100 may provide defaults specifying when a shape drawn using the drawing tools should be immediately converted into a lens, and when it should be treated as a conventional (non-selectable) drawn object. System 100 may also provide means permitting the user to change these defaults, and to change a drawn shape into a lens, or vice versa.

Thus, for example, system 100 may provide a default specifying that any closed shape is to be made into a lens. Thus, if the user draws a circle using the circle tool, a new lens will be created. However, if the user draws an open-ended shape using a line tool, the shape will simply be a non-selectable object, treated as it would be in any conventional drawing program. The user may be able to convert the circle into a non-selectable object, or the open-ended shape into a lens, as desired.

Depending on the default settings, if the user chooses a drawing tool, he or she may be given an opportunity to create a new object. Object creation may be done in one of two modes: interactive and non-interactive. In interactive mode, the user first specifies 1211 the image processing attributes of the new object (or accepts defaults), then defines 1212 the object region by drawing on the screen, using the selected drawing tool. As the object region is drawn, system 100 simultaneously renders 1212 the effects specified by the attributes of the new object. Rendering is the process of applying the effects to the source image to produce a-transformed image. It is accomplished using known image processing techniques. Thus, the user can instantly see the effects of the new object as it is being drawn. If the user specifies 1217 lens creation, system 100 adds 1213 a new lens having the specified attributes to database 108. If the user does not specify 1217 lens creation, system 100 adds 1218 a conventional (non-selectable) object having the specified attributes to database 108. Such an object is known as "non-selectable" because, once it has been created, it may not be selected and modified as a lens may be.

In the preferred embodiment, display area 201 is subdivided into a plurality of tiles, as will be described in more detail below. Accordingly, system 100 now determines 1214 which tiles are affected by the presence of the new lens, and re-renders 1215 those affected tiles.

In non-interactive mode, the user first defines 1206 the lens region by drawing on the screen, and further specifies 1208 the image processing attributes of the lens. System 100 then stores 1209 the lens and its attributes in database 108. System 100 then renders 1210 the effects specified by the attributes, determines 1214 which tiles are affected by the present of the new lens, and re-renders 1215 those affected files. Non-interactive mode allows the user to specify all lens attributes prior to rendering, thus avoiding intermediate rendering that may degrade performance. Furthermore, system 100 may have different defaults for lens creation in non-interactive mode, as opposed to interactive mode. For example, the defaults may specify that open-ended shapes automatically become lenses in non-interactive mode, but they remain conventional (non-selectable) drawn objects in interactive mode.

If the user chooses 1202 the selection tool, he or she is given an opportunity to select and modify an existing lens. First, the user moves an on-screen cursor to select 1203 an existing lens. System 100 employs well-known user interface techniques to permit the user to select a particular lens or group of lenses, and to invoke a modification to be performed on the selected lenses. Typically, selection is accomplished by manipulating a mouse (or similar pointing device) to move an on-screen cursor onto the lens, and clicking a button. The user then performs 1204 lens modification. Modifications may be invoked by clicking on an on-screen button, or using an on-screen pull-down menu, or typing a command on a keyboard. The selection and command techniques are well known for moving and controlling graphical objects in conventional drawing programs. The present invention uses such techniques to permit manipulation of lens objects, thus facilitating modification of image processing elements as well as the image elements themselves.

Figure 13:
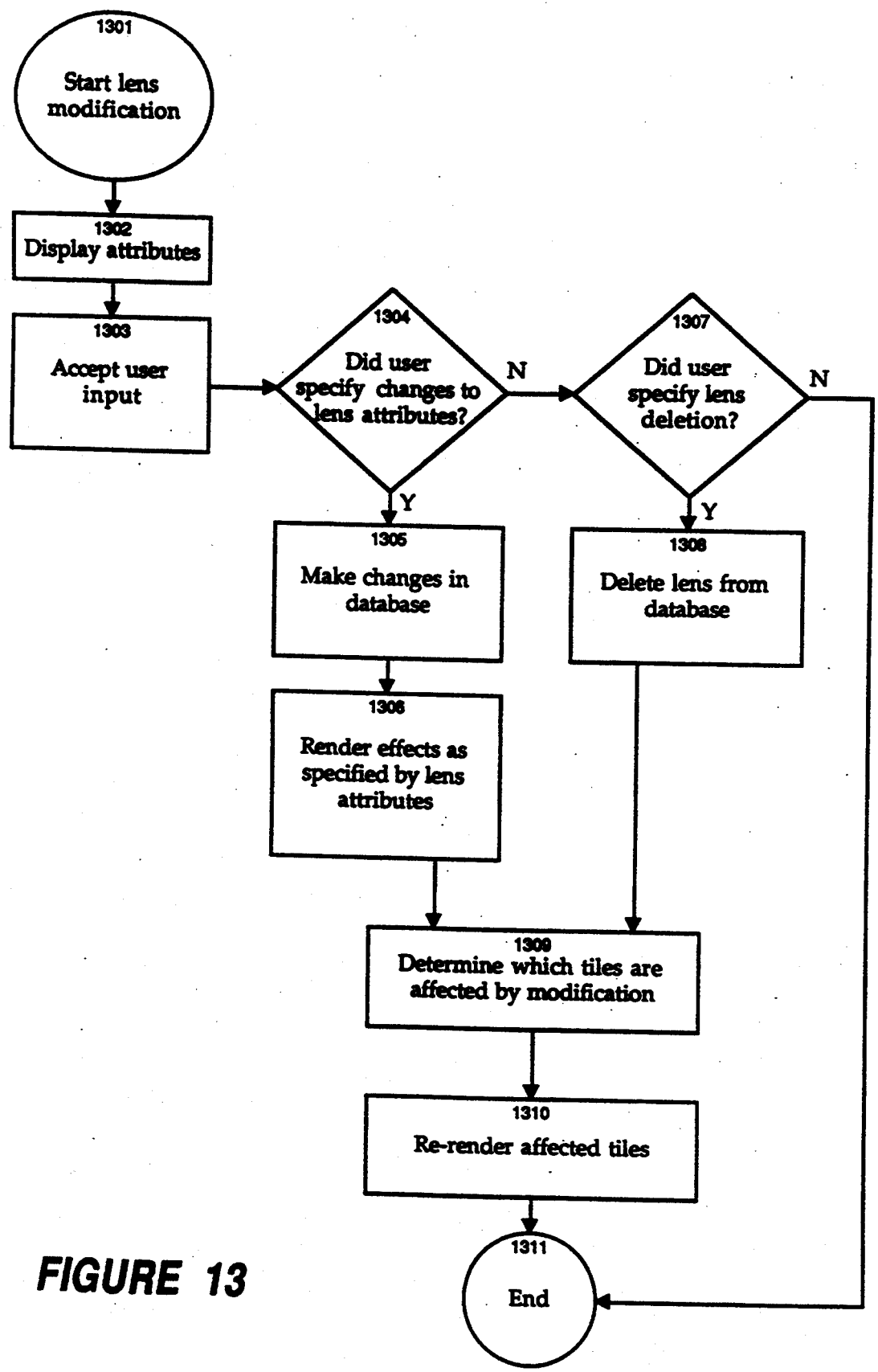
FIG. 13 is a flowchart showing a lens modification operation of the present invention.

Referring now to FIG. 13, there is shown a flowchart of a lens modification operation of the preferred embodiment. System 100 displays 1302 the attributes of the selected lens, and accepts 1303 the user's input specifying the modifications to be made. Several types of lens object modification are possible, including:

Two-dimensional (x-y) movement along the surface of the image
Vertical (z) movement to change the order in which the lenses are stacked
Rotation
Distortion of the lens shape
Scaling (changing the size of the lens)
Flipping (along a selected axis)
Editing (adding, deleting, or modifying any of the internal operations or attributes of the lens)
In addition, the user may specify deletion of a lens.
If the user specifies 1304 changes to the lens attributes, system 100 makes 1305 the corresponding changes in database 108. Once the changes have been made, system 100 renders 1306 the lens effects as specified by the new lens attributes. System 100 then determines 1309 which tiles are affected by the lens attribute modification, and re-renders 1310 those affected tiles. Tiling is described in more detail below.

If the user does not specify 1304 changes to lens attributes, but instead specifies 1307 lens deletion, system 100 deletes 1308 the selected lens from database 108. As with lens modification, system 100 then determines 1309 which tiles are affected by the lens attribute modification, and re-renders 1310 those affected tiles.

If the user does not specify changes 1304 or deletion 1307, the selected lens is unaffected.

Figure 5:
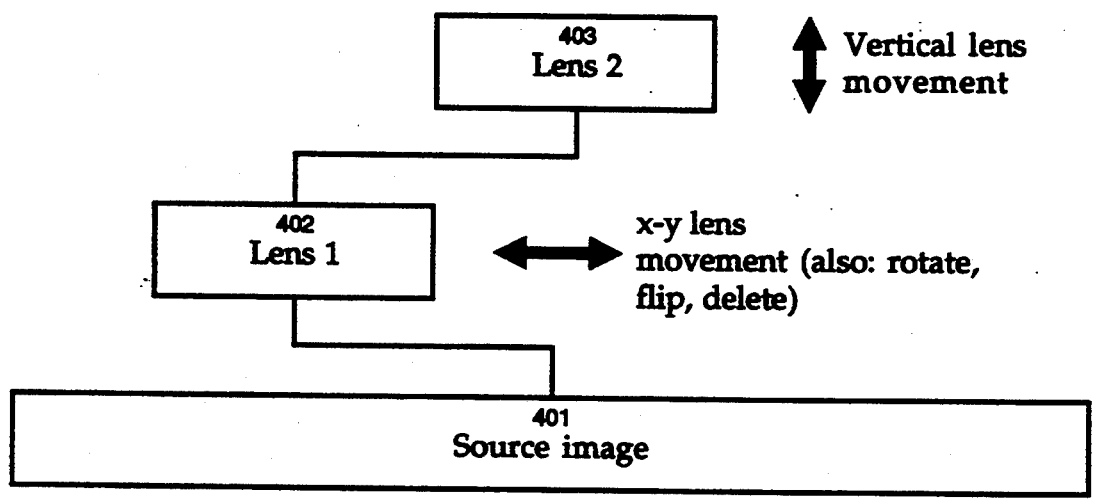
FIG. 5 is a block diagram showing examples of lens object modification.

Referring now to FIG. 5, there is shown an example of lens modification. Lens 1 (402) is shown being moved in the x-y plane, and lens 2 (403) is shown being moved along the z axis. If lens 2 (403) were moved below the plane of lens 1 (402), the result would be that lens 2 would operate on source image 401 before lens 1 (402).

Image Re-rendering

As discussed previously, when a lens is added, deleted, or modified, system 100 re-renders only that portion of the transformed image that is affected by the lens. Thus, when a particular lens object is added, modified, moved, or deleted, all lens objects in database 108 are checked to see if their region of operation overlaps the location of the particular lens object. System 100 re-renders lens effects for each lens object having a region of operation that is found to overlap the particular lens object.

Figure 6:
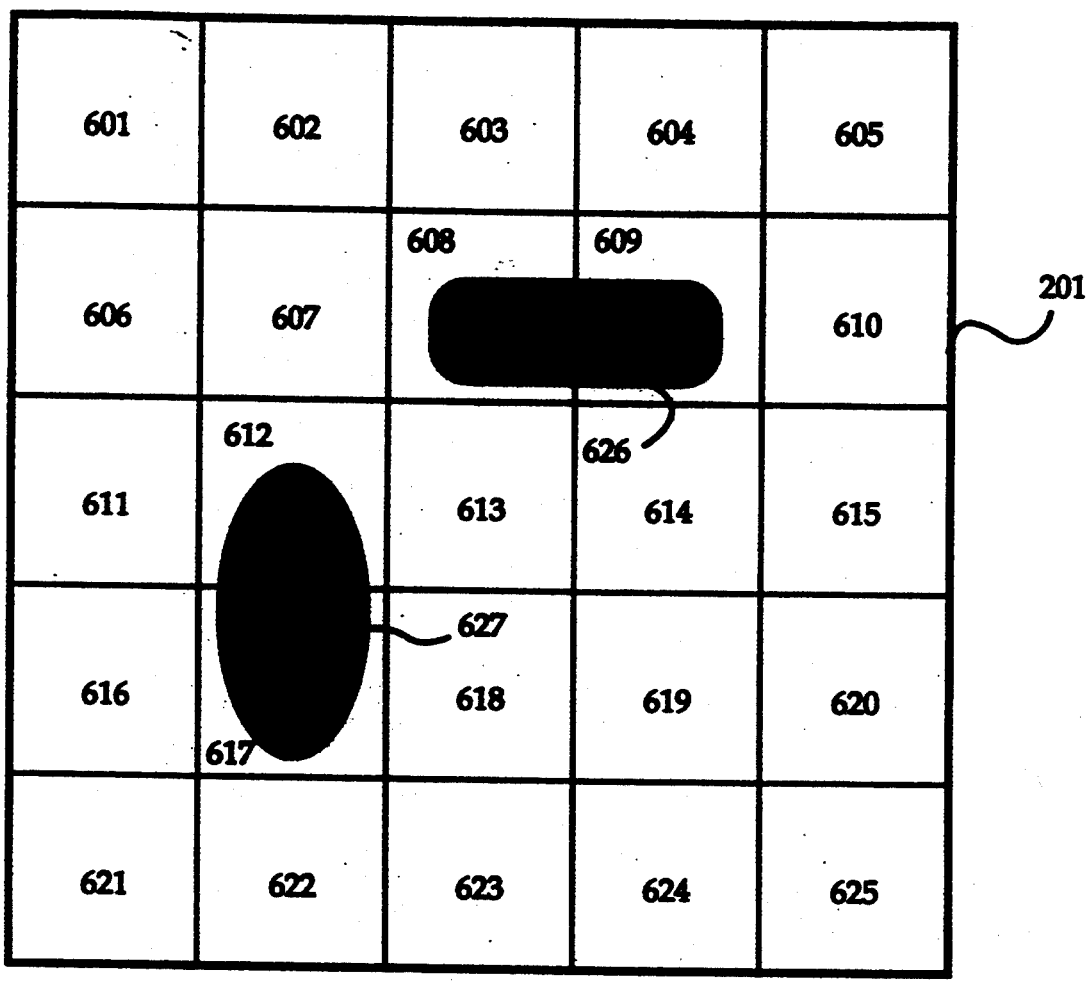
FIG. 6 is a diagram showing a tiling technique.

To improve performance in connection with re-rendering, the preferred embodiment of system 100 employs an image storage technique called "tiling." Referring now to FIG. 6, display area 201 is subdivided into a number of tiles 601–625. The region of each lens is associated with one or more tiles. In the example shown, lens object 626 has a region associated with tiles 608 and 609, while lens object 627 has a region associated with tiles 612 and 617. The association between a lens and its tiles is stored in memory, so that when a lens is edited, moved, or deleted, only the tiles associated with the lens (both before and after the edit, movement, or deletion), are re-rendered. Thus, rather than re-rendering lens effects for particular lenses, system 100 re-renders lens effects within affected tiles. Other tiles, not affected by the changes to the lens, are not re-rendered. Thus, in the example of FIG. 6, if lens object 626 were modified, only tiles 608 and 609 would be re-rendered.

Figure 7A:
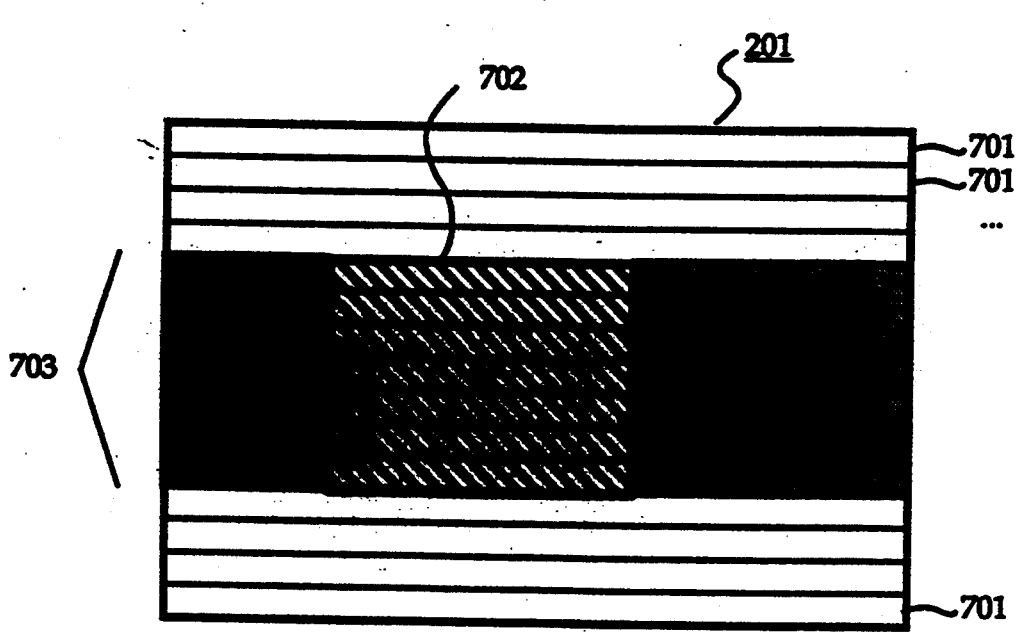
FIGS. 7A and 7B show a comparison between conventional bitmap storage and tiled storage.
Figure 7B:
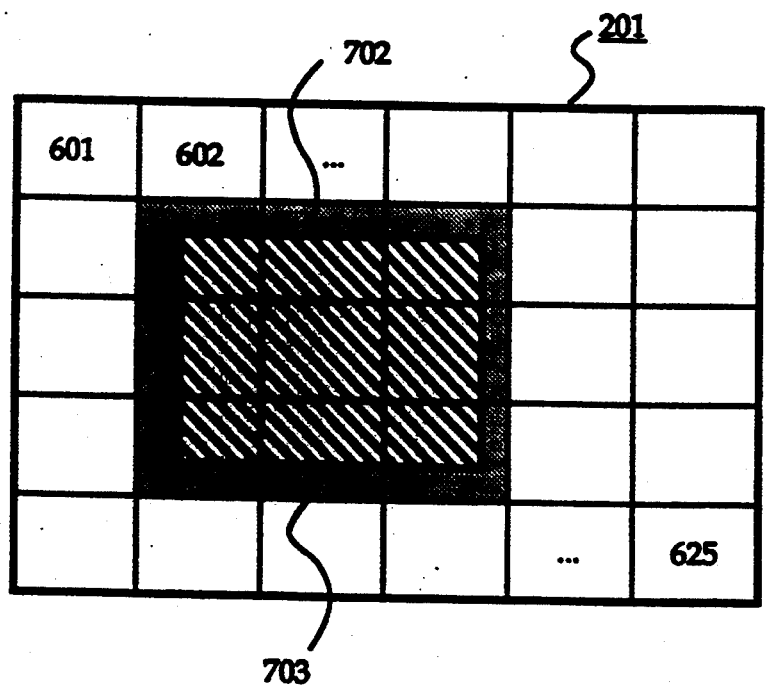

In addition to facilitating partial re-rendering of transformed images, tiling provides efficiencies in data storage and retrieval. Referring now to FIG. 7A, there is shown an example of a conventional bitmap storage method that stores the pixel bitmap row by row, so that a contiguous block of stored data represents a "band" 701 of the display area 201. Thus, when a segment 702 of an image is to be stored, retrieved, or otherwise accessed, the system must deal with extraneous data 703 representing each entire band 701 containing part of segment 702. Referring now to FIG. 7B, there is shown a similar example employing a tiling technique. Here, if portion 702 is to be accessed, system 100 reads only those tiles containing some part of segment 702. Thus, the quantity of extraneous data 703 is minimized. In this way, tiling provides greater efficiencies in data access when a segment 702 of display area 201 is to be processed.

Snapshot

The present invention allows a user to take a "snapshot" of the image, including all lens objects, at a particular time. When a snapshot is taken, system 100 stores the state of the image for later retrieval. Several snapshots may be taken in succession, allowing the user to return to any of a number of previous states.

Figure 14:
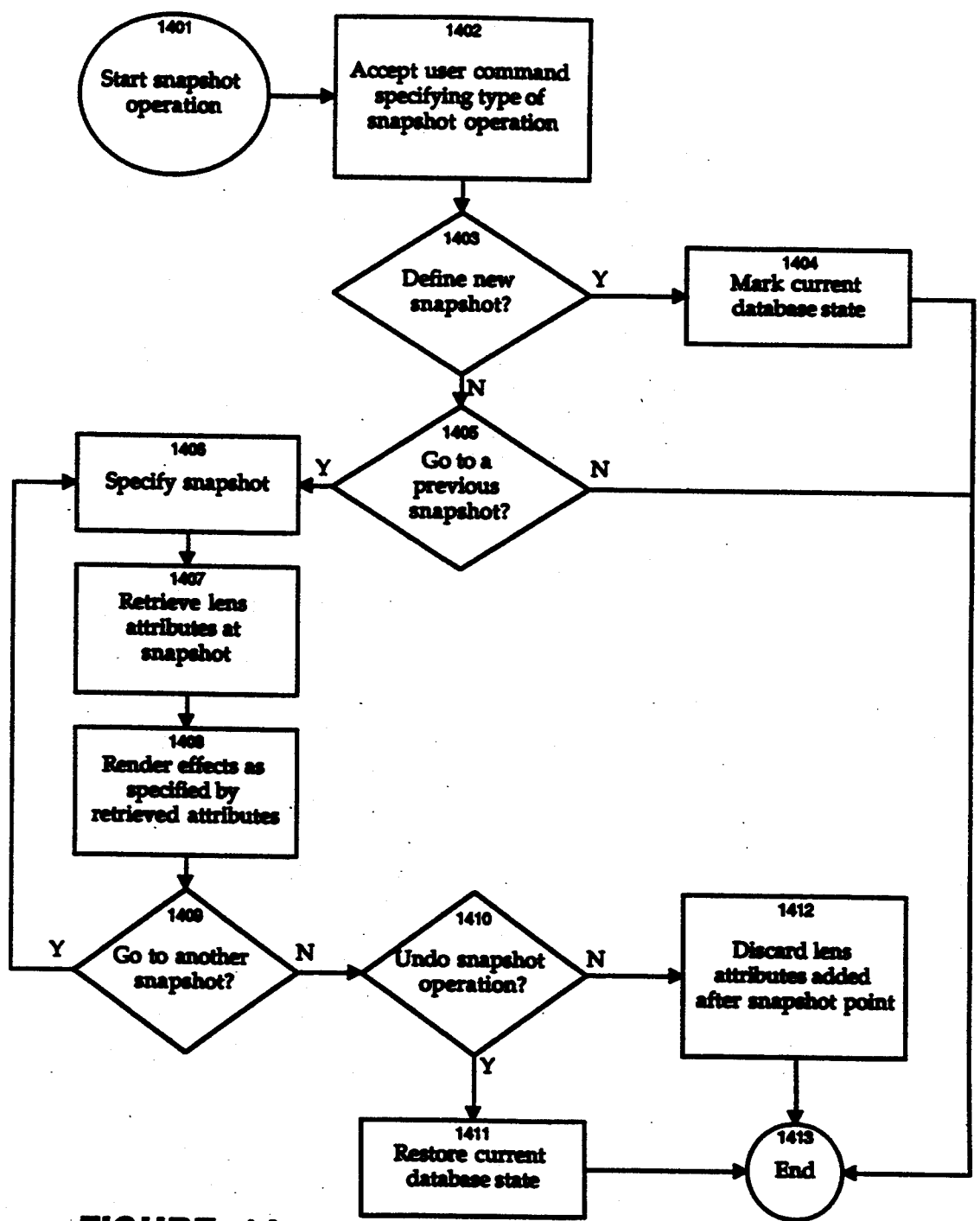
FIG. 14 is a flowchart showing a snapshot operation of the present invention.

Referring now to FIG. 14, there is shown a flowchart of snapshot operation according to the present invention. When the user specifies that he or she wishes to perform a snapshot operation, system 100 accepts 1402 a user command specifying the particular type of operation desired. The user enters this information using conventional user interface techniques, such as an on-screen menu, a button, or a keyboard command. If the user elects to define 1403 (or "take") a new snapshot, system 100 marks 1404 the current state of the lens attribute database with a tag, so that it may be retrieved later.

If the user elects to go to a previous snapshot 1405, he or she specifies 1406 the desired snapshot. Snapshots may be identified by unique names or other indicators. Once a snapshot has been specified, system 100 retrieves 1407 the lens attributes at the specified snapshot by finding the lens attribute database tag matching the specified snapshot, and retrieving lens attributes from the database. System 100 then renders 1408 the effects specified in the retrieved lens attributes.

If the user elects to go to another snapshot 1409, system 100 repeats steps 1406 to 1409. If not, the user is given the option of undoing 1410 the snapshot operation. If he or she elects to undo, system 100 restores 1411 the current state of the database and screen. If the user does not want to undo the snapshot operation, system 100 discards 1412 all lens attributes that were added after the snapshot point. Thus, the image is returned to the state it had at the time of the snapshot point.

By taking snapshots at various times during image manipulation, the user is able to save a series of previous states. Thus, he or she can freely experiment with different lens configurations without fear of losing a past configuration.

User Interface

Referring now to FIGS. 8A, 8B, 8C, 9A, and 9B, there are shown sample screen shots of the user interface of the preferred embodiment. As is evident from the Figures, the user interface is consistent with generally accepted principles of user interface design. In particular, the user creates and modifies lens objects in a manner that is consistent with creation and modification of graphical objects in conventional drawing programs. Scrolling, window resizing, and other functions are performed as in typical window-based application programs.

Figure 8C:
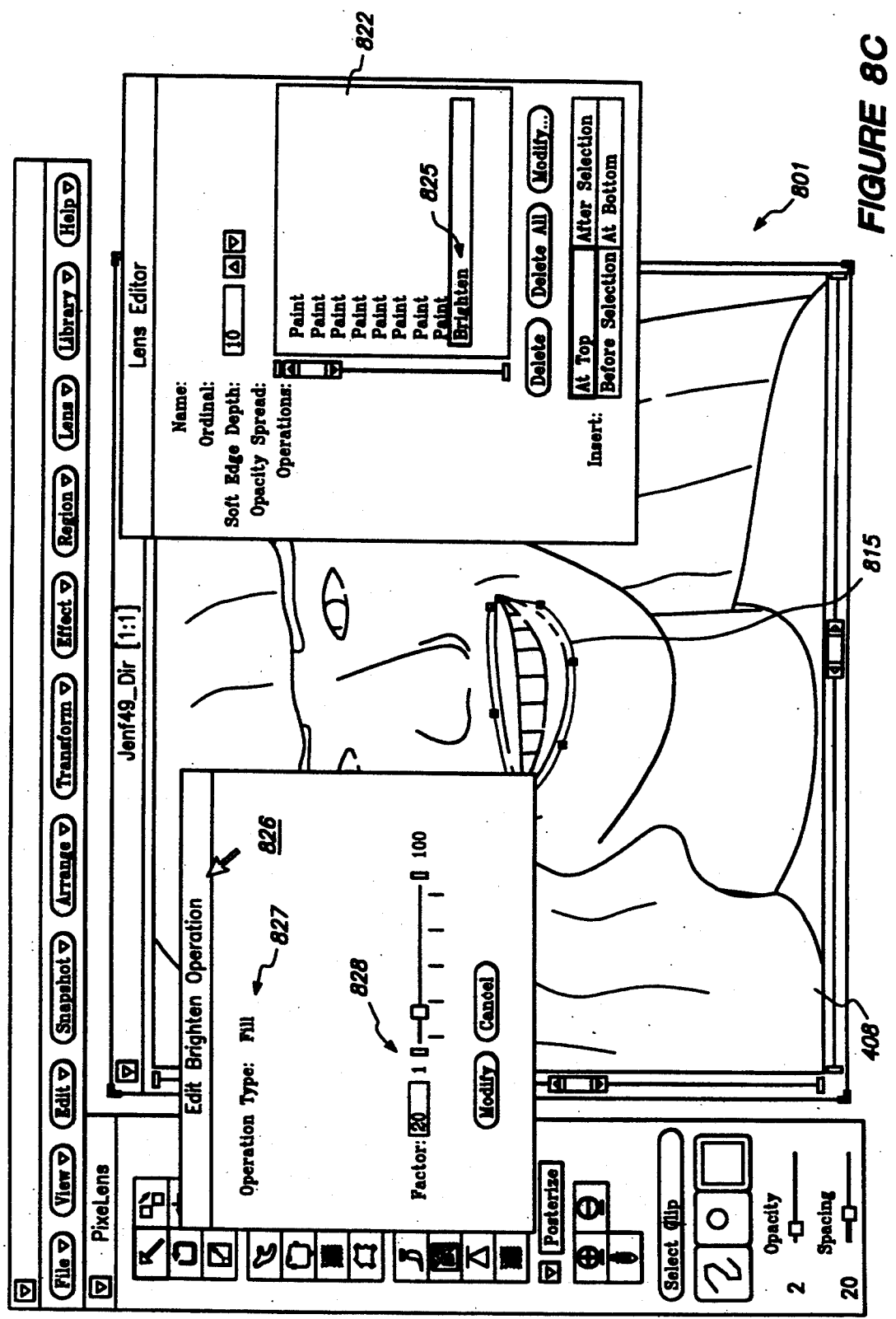
FIGS. 8A, 8B, and 8C show examples of a user interface for lens attribute specification according to the present invention.
Figure 8B:
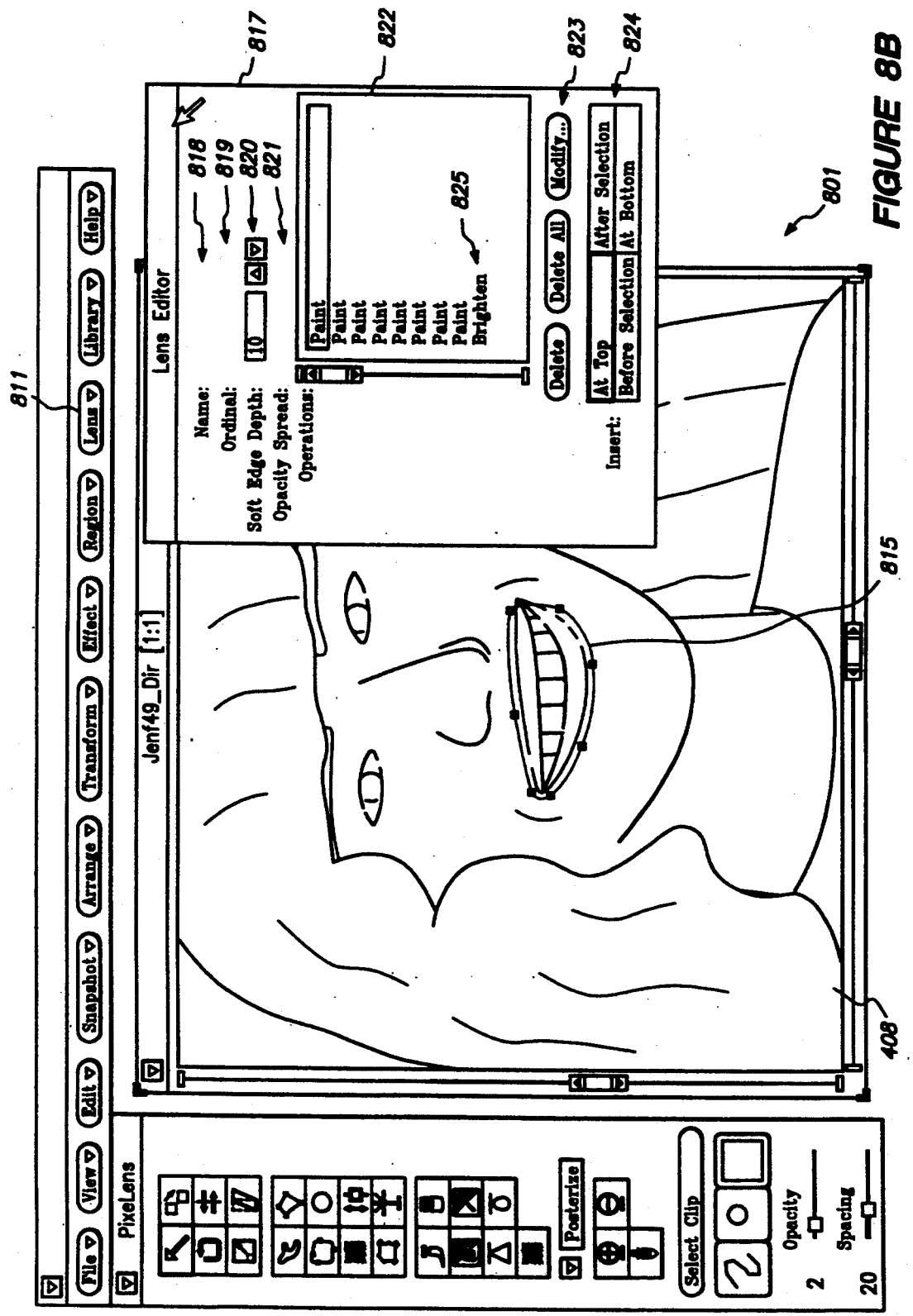
Figure 8A:
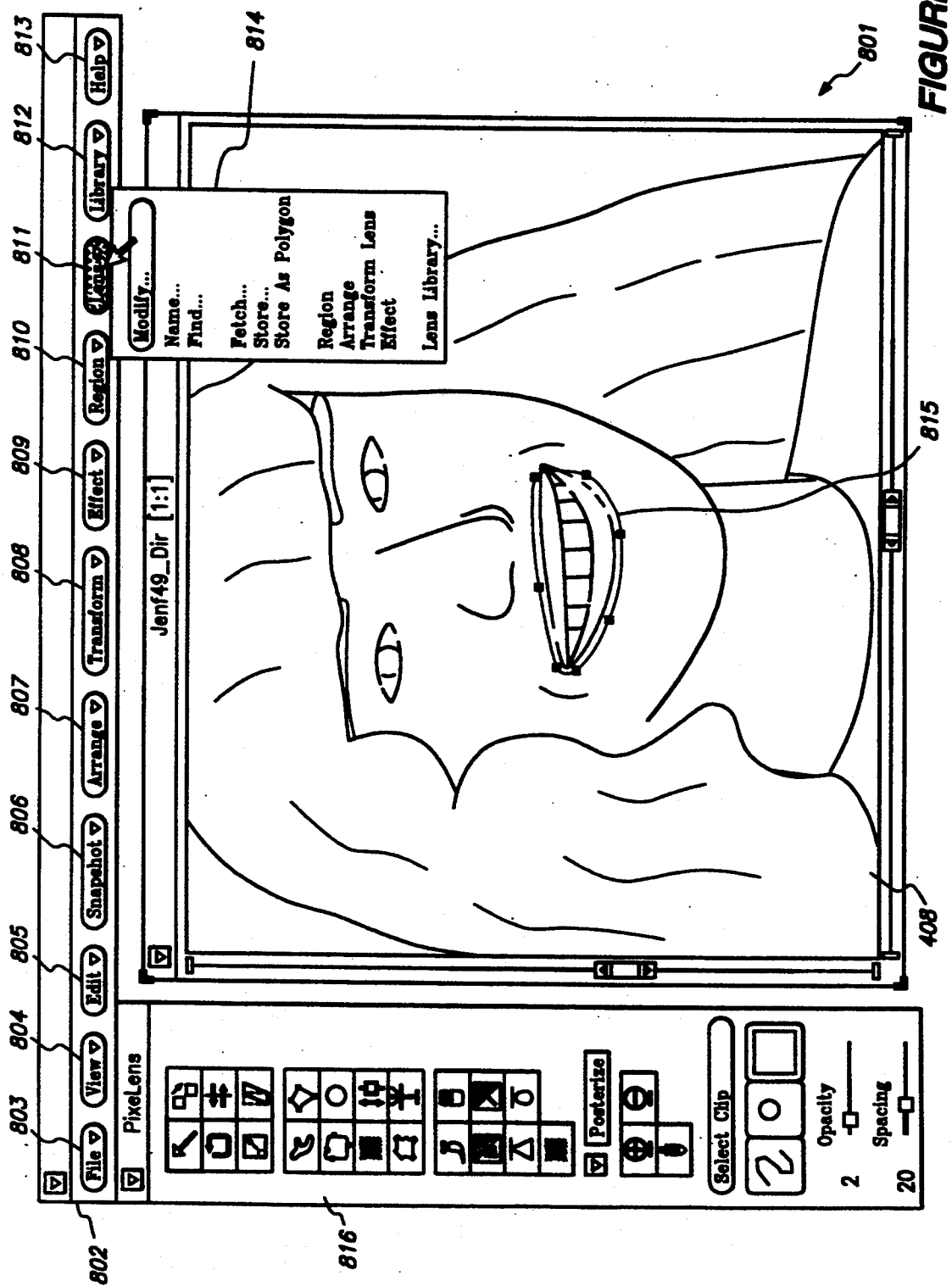

Referring now to FIG. 8A, there is shown a sample screen 801 during typical operation of the invention. Menu bar 802 is provided, including a series of buttons 803-813 for accessing various types of commands, as follows: button 803 provides access to conventional file commands such as opening, saving, deleting, or otherwise manipulating a file; button 804 provides access to conventional view-related commands, such as scrolling, zooming in or out, or changing views; button 805 provides access to conventional edit-related commands, such as cut, copy, and paste; button 806 provides access to snapshot commands, as described above; buttons 807 through 811 provide access to various object-related commands, including arranging 807, transforming 808, controlling effects 809, specifying regions 810, and general lens-related operations 811; button 812 provides access to conventional library-related commands; and button 813 provides access to conventional help-related commands.

When the user clicks on one of buttons 803-813, a pull-down menu is presented, allowing the user to select a command. In the example shown in FIG. 8A, the user has clicked on lens button 811, and pull-down menu 814 is presented. The user may select among any of the commands listed in pull-down menu 814. The selected command will operate on lens 8115 that has been previously selected and is highlighted on screen 801.

Tool box 816 provides access to various draw-related tools that can be used to draw lenses and/or non-selectable objects. Tool box 816 includes tools for performing functions such as: selecting; moving; rotating; flipping; scaling; shearing; defining regions of various types; painting; erasing; brightening; darkening; sharpening; blurring; spreading color; magnifying; reducing; sampling color; stroking; brushing; specifying brush color; specifying brush opacity; and specifying brush frequency. Each such tool in tool box 816 is represented by a unique icon.

Referring now to FIG. 8B, there is shown screen 801 after the user has selected a "lens modify" command from pull-down menu 814. Lens editor dialog box 817 is presented, allowing the user to make changes to lens 815 that has been previously selected. Lens editor dialog box 817 allows the user to specify or change the lens name 818, the lens ordinal 819 (which determines the vertical positioning of the lens, as shown in FIG. 4), region edge blending (or soft edge depth) 820, and opacity spread 821. In addition, dialog box 817 contains list 822 of image processing operations performed by selected lens 815. In the example shown, list 822 includes eight "Paint" operations and one "Brighten" operation 8215. The user may select any of these operations by clicking on it, and may modify or delete them using operation editing buttons 823. The user may also add new operations at selected positions in list 822 using operation insertion buttons 824.

Referring now to FIG. 8C, there is shown screen 801 after the user has selected "Brighten" operation 825 and clicked on "Modify". Operation editor dialog box 826 is presented, allowing the user to make changes to the parameters of "Brighten" operation 825. Operation editor dialog box 826 allows the user to specify or change the operation type 827 and the magnitude, or factor, of the operation 828. In the example shown, the "Brighten" operation has an operation type called "fill", meaning it fills the entire region of operation, and a factor of 20, meaning the brightness is applied at 20% of maximum intensity. Thus, this operation brightens the region of lens 815 by a factor of 20.

Figure 9A:
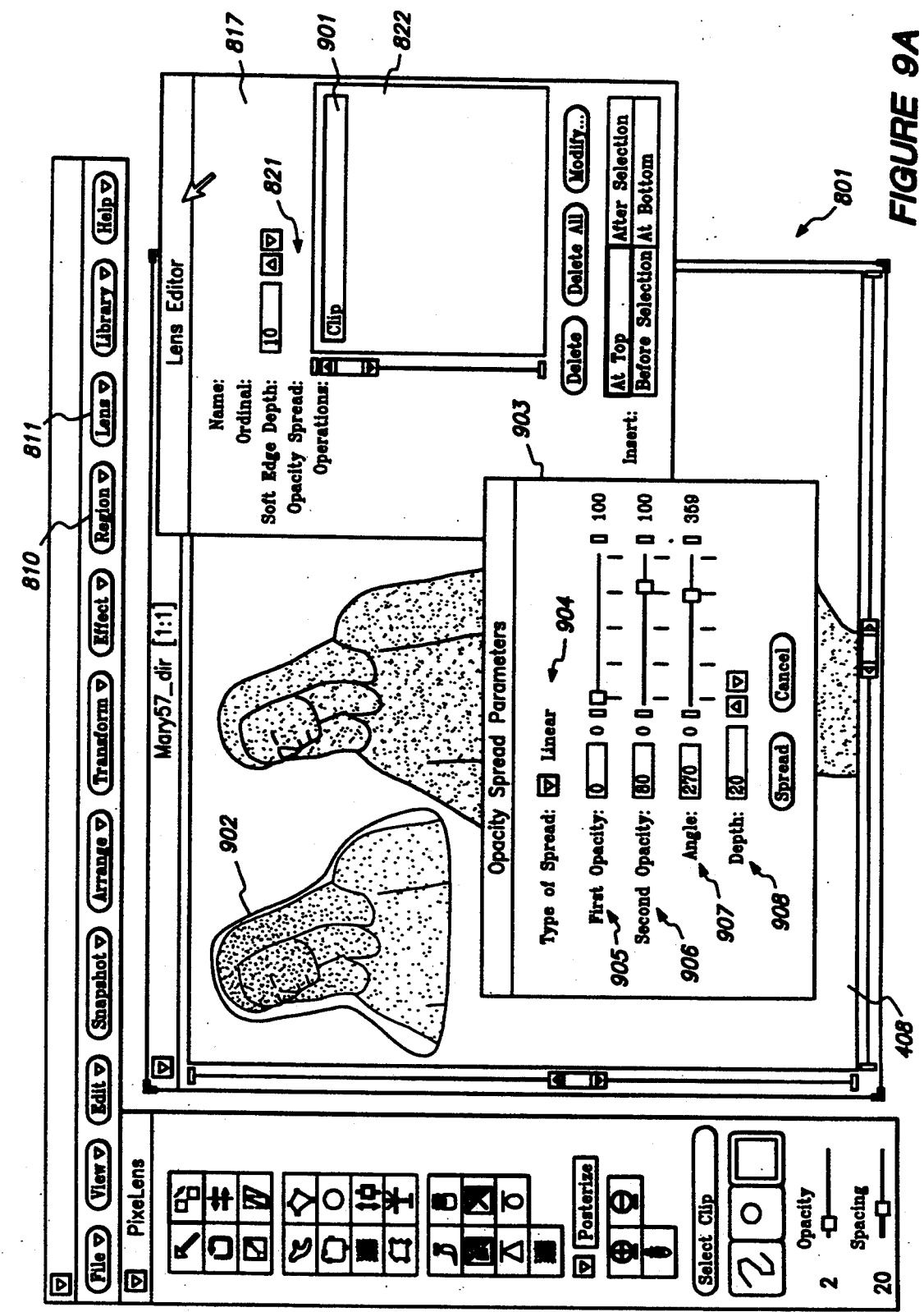
FIGS. 9A and 9B show examples of a user interface for opacity spread specification according to the present invention.

Referring now to FIG. 9A, there is shown an example of screen 801 as the user is specifying opacity spread. Again, the user has selected "lens modify" from pull-down menu 814. Lens editor dialog box 817 shows the attributes for lens 902 that has been previously selected, including operation list 822. As shown in list 822, lens 902 has clip operation 901, which clips a portion of the bitmap of the source image. Thus, lens 902 displays a portion of the source image representing the head of a statue in the source image. In this example, the user has clicked on opacity spread 821 to access opacity spread dialog box 903. Dialog box 903 shows: the type of spread 904, which may be linear, circular, or the like; the limiting opacities for the spread, first 905 and second 906; and the angle 907 along which the opacity gradient occurs. There may also be depth parameter 908, but it is dimmed in this example because it is not applicable. Thus, in the example shown, lens 902 has a linear opacity spread ranging from zero to 80%, with a gradient angle of 270 degrees. Accordingly, the bottom portion of lens 902 is transparent, while the top portion is relatively opaque, with a linear gradient between the two extremes. The user may change any of these parameters using dialog box 903.

Figure 9B:
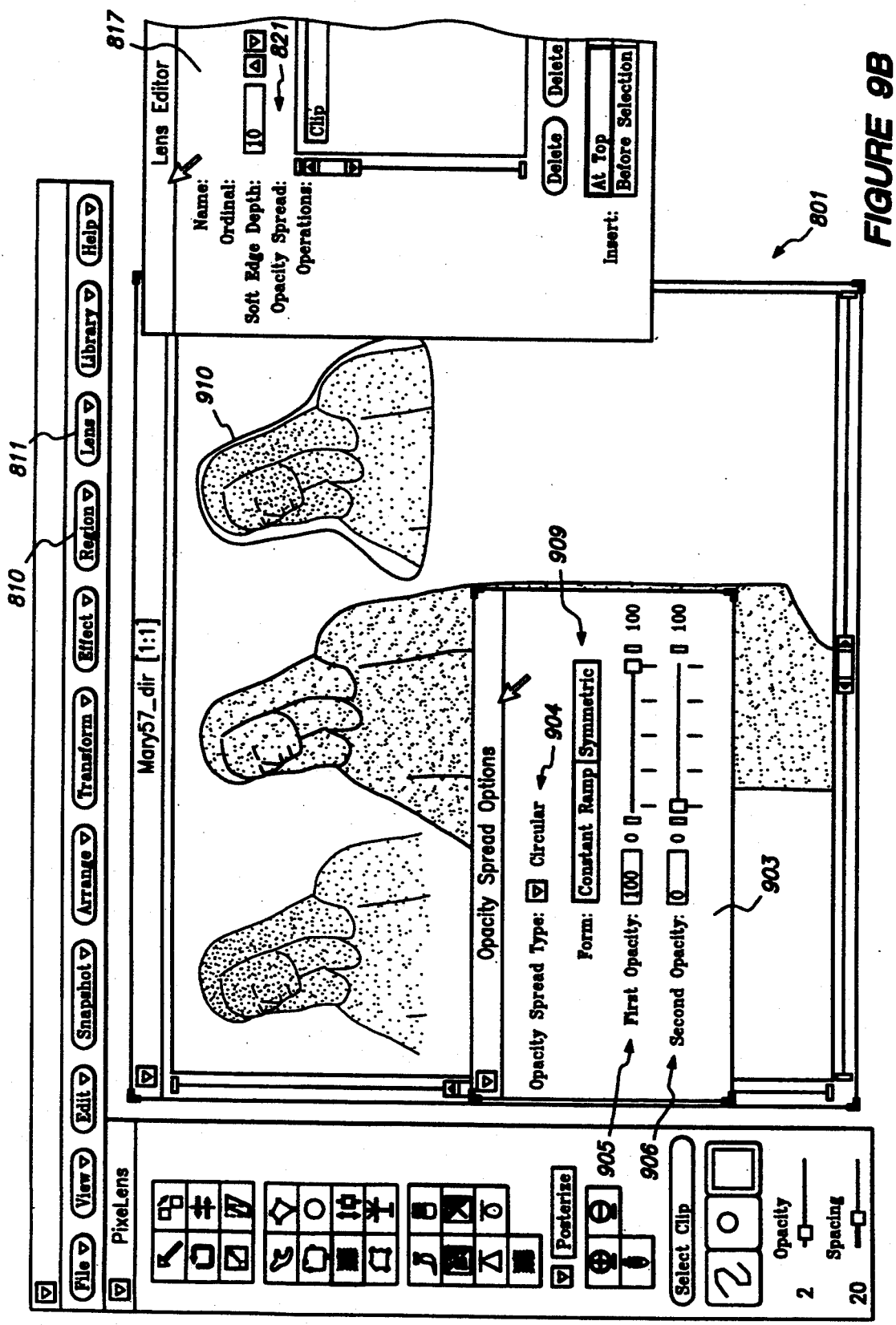

Referring now to FIG. 9B, there is shown another example of screen 801 as the user is specifying opacity spread. Again, the user has selected "lens modify" from pull-down menu 814. Lens 910 is selected, and lens editor dialog box 817 shows similar information as was shown in FIG. 9A. Again, the user has clicked on opacity spread 821 to access opacity spread dialog box 903. Here, opacity spread 904 is circular, with first opacity 905 of 100% and second opacity 906 of 0%. A circular spread may have one of two selectable forms 909, namely constant ramp or symmetric. Here, the user has selected constant ramp. Thus, lens 910 shows a ramped circular opacity gradient.

The above-described user interface is merely exemplary. As will be apparent to those skilled in the art, many other types of user interface design could be employed without departing from the spirit or essential characteristics of the invention.

From the above description, it will be apparent that the invention disclosed herein provides a novel and advantageous system and method of image processing. The foregoing discussion discloses and describes merely exemplary methods and embodiments of the present invention. As will be understood by those familiar with the art, the invention may be embodied in other specific forms without departing from the spirit or essential characteristics thereof. For example, lens objects may possess other attributes than disclosed herein. Attributes may be time-variant according to user specification. Additionally, other methods of manipulating lens objects may be provided. Accordingly, the disclosure of the present invention is intended to be illustrative, but not limiting, of the scope of the invention, which is set forth in the following claims.

What is claimed is:

1. In a computer system including a processor, a memory, and a display, a computer-implemented image processing system for transforming a source image into a transformed image with at least one image processing operation, comprising:

source image input means for inputting a source image;

lens editing means for creating in the memory and manipulating on the display a plurality of software objects representing lenses, each lens having a plurality of attributes including a defined region corresponding to a portion of the source image and at least one image processing operation, each lens for applying at least one image processing operation to the portion of the source image corresponding to the defined region of the lens, to produce a transformed image;

a storage device, coupled to the lens editing means, for storing a database including the source image along with each lens and its attributes for selective subsequent retrieval and modification of a lens in response to user specification;

a user input device, coupled to the storage device and the lens editing means, for accepting user specification of a selected number of lenses in the database, for accepting user specification of the attributes of the lenses, and for accepting user'specification of modifications to stored lens attributes, wherein the specified or modified attributes and lenses are stored in the database; and an output device, coupled to the lens editing means and the database, for outputting the transformed image.

2. The computer-implemented image processing system of claim 1, wherein the plurality of lenses comprises:

a first lens for transforming a portion of the source image corresponding to the defined region of the first lens by applying at least one image processing operation included in the attributes of the first lens, to produce an intermediate image;

at least one intermediate lens, each intermediate lens for successively transforming a portion of the intermediate image corresponding to the defined region of the intermediate lens by applying at least one image processing operation included in the attributes of the intermediate lens; and a last lens for transforming a portion of the intermediate image corresponding to the defined region of the last lens by applying at least one image processing operation included in the attributes of the last lens, to produce the transformed image.

3. The computer-implemented image processing system of claim 2, wherein the defined regions of the lenses selectively overlap one another in response to user specification in the attributes of the lenses with the user input device.

4. The computer-implemented image processing system of claim 1, wherein selected image processing operations simulate physical lens operations.

5. The computer-implemented image processing system of claim 1, wherein the plurality of attributes of a lens includes:

pixel data specification for the lens defining pixel data to be applied to a portion of the source image corresponding to the defined region of the lens; and region blending specification defining a degree of blending between the pixel data and a subportion of the source image within the portion of the source image corresponding to the defined region.

6. The computer-implemented image processing system of claim 1, wherein the plurality of attributes of a lens includes a region edge blending specification defining a degree of blending between a periphery of a first portion of the source image corresponding to the defined region and a second portion of the source image around the periphery of the first portion.

7. The computer-implemented image processing system of claim 1, wherein the plurality of attributes of a lens includes an opacity spread definition defining an opacity spread area corresponding to a portion of the source image and an opacity-varying function, for controlling an image processing operation within the opacity spread area.

8. The computer-implemented image processing system of claim 1, wherein the plurality of attributes of a lens includes a secondary mask definition defining a secondary region within which the image processing operations of selected lenses do not transform the source image.

9. The computer-implemented image processing system of claim 1, further comprising:

means for selectively and independently altering the attributes of a lens in response to user specification; and wherein the storage device stores the altered attributes in the database for selective subsequent retrieval and modification in response to user specification.

10. The computer-implemented image processing system of claim 1, further comprising:

means for selectively saving in the database in the storage device a lens configuration comprising the attributes of each of a plurality of lenses; and means for selectively restoring a previously saved lens configuration.

11. The computer-implemented image processing system of claim 1, wherein:

the source image comprises a first bitmap including pixel data; and the transformed image comprises a second bitmap including pixel data.

12. The computer-implemented image processing system of claim 1, wherein:

the source image is subdivided into a plurality of non-overlapping source tiles, each source tile corresponding to a region of the source image;

and the transformed image is subdivided into a plurality of non-overlapping transformed tiles, each transformed tile corresponding to one region of the transformed image that was produced from one source tile of the source image by an image processing operation of a lens entering the source tile.

13. The system of claim 1, wherein the plurality of lenses transform portions of the source image corresponding to the defined regions of the lenses by applying a plurality of operations included in the attributes of the lenses.

14. A computer-implemented image processing system for transforming a source image into a transformed image with at least one image processing operation, comprising:

source image input means for inputting a source image;

tiling means for subdividing the source image into a plurality of nonoverlapping source tiles, each source tile corresponding to a portion of the source image;

lens editing means for creating and manipulating a plurality of software objects representing lenses, each lens having a plurality of attributes including a defined region corresponding to portions of selected source tiles of the source image, and at least one image processing operation, each lens applying at least one image processing operation to the portions of selected source tiles of the source image corresponding to the defined region of the lens to produce transformed tiles;

a storage device, coupled to the lens editing means, for storing the lens attributes in a database for selective, independent subsequent retrieval and modification in response to user specification;

a user input device, coupled to the storage device and the lens editing means, for accepting user specification of a selected number of lenses in the database, for accepting user specification of the attributes of the lenses, and for accepting user specification of modifications to stored lens attributes, wherein the specified or modified attributes and lenses are stored in the database; and an output device, coupled to the lens editing means, for aggregating selected untransformed source tiles and selected transformed tiles into a transformed image and outputting the transformed image.

15. The system of claim 14, wherein the plurality of lenses transform portions of selected source tiles of the source image corresponding to the defined regions of the lenses by applying a plurality of operations included in the attributes of the lenses.

16. A computer-implemented image processing method, comprising the steps of:

accepting input describing a source image;

defining at least one software object representing a lens, each lens having a plurality of attributes including a defined region corresponding to a portion of the source image and at least one image processing operation;

storing the attributes of each lens in a database;

selectively retrieving from the database and modifying the attributes of a lens in response to user specification;

retrieving from the database the attributes of a selected lens;

transforming the portions of the source image corresponding to the defined regions of the selected lens by applying at least one image processing operation included in the retrieved attributes of each selected lens to the portion of the source image corresponding to the defined region of the selected lens, to produce a transformed image; and outputting the transformed image.

17. The computer-implemented image processing method of claim 16, wherein the step of defining at least one lens comprises the substeps of:

specifying a subset of the attributes of the lens; and designating a shape within the source image to specify the defined region.

18. The computer-implemented image processing method of claim 17, wherein the step of defining at least one lens further comprises the substep of simultaneously with the substep of designating a shape, selectively transforming a portion of the source image corresponding to the designated shape by applying at least one image processing operation included in the subset of the attributes to the portion of the source image, to produce a transformed image.

19. The computer-implemented image processing method of claim 16, wherein the step of transforming the portions of the source image comprises the substeps of:

(a) transforming a portion of the source image corresponding to the defined region of a first lens by applying at least one image processing operation included in the attributes of the first lens to the portion of the source image corresponding to the defined region of the first lens, to produce an intermediate image;

(b) transforming, subsequent to the transformation by the first lens, a portion of the intermediate image corresponding to the defined region of an intermediate lens by applying at least one image processing operation included in the attributes of the intermediate lens to the portion of the intermediate image corresponding to the defined region of the intermediate lens;

(c) selectively repeating substep (b) for any number of intermediate lenses, each transformation by an intermediate lens subsequent to the transformation of a prior intermediate lens; and (d) transforming, subsequent to the transformation by an intermediate lens, a portion of the intermediate image corresponding to the defined region of a last lens by applying at least one image processing operation included in the attributes of the last lens to the portion of the intermediate image corresponding to the defined region of the last lens, to produce the transformed image.

20. The computer-implemented image processing method of claim 16, wherein the step of defining a plurality of attributes for a lens further comprises the substeps of:

specifying pixel data for the lens to be applied to a portion of the source image corresponding to the defined region of the lens; and specifying region blending defining a degree of blending between the pixel data and a subportion of the source image within the portion of the source image corresponding to the defined region.

21. The computer-implemented image processing method of claim 16, wherein the step of defining a plurality of attributes further comprises the substep of specifying a region edge blending specification defining a degree of blending between a periphery of a first portion of the source image corresponding to the defined region and a second portion of the source image around the periphery of the first portion.

22. The computer-implemented image processing method of claim 16, further comprising the steps of:
selectively altering the attributes of at least one lens in response to user specification; and
selectively re-transforming portions of the source image corresponding to a subset of the defined regions of the altered lens by applying operations specified in the altered attributes of the lens, to produce a re-transformed image.

23. The computer-implemented image processing method of claim 22, further comprising the steps of:
storing portions of intermediate images; and
retrieving stored portions of intermediate images where re-transformation is not needed.

24. The computer-implemented image processing method of claim 16, further comprising the steps of:
selectively saving in the database a lens configuration comprising the attributes of each of a plurality of lenses; and
selectively restoring a previously saved lens configuration.

25. The computer-implemented method of claim 14, wherein the transforming step comprises transforming portions of the source image corresponding to the defined regions of the lenses by applying a plurality of operations included in the retrieved attributes of the lenses.

26. A computer-implemented image processing system for transforming a source image into a transformed image with at least one image processing operation, comprising:
source image input means for inputting a source image;
lens editing means for creating and manipulating a plurality of software objects representing lenses, each lens having a plurality of attributes including a defined region corresponding to a portion of the source image and at least one image processing operation, each lens for applying at least one image processing operation to the portion of the source image corresponding to the defined region of the lens, to produce a transformed image, the plurality of lenses including:
a first lens for transforming a portion of the source image corresponding to the defined region of the first lens by applying at least one image processing operation included in the attributes of the first lens, to produce an intermediate image;
a selected number of intermediate lens, each intermediate lens for successively transforming, after the transformation by the first lens, a portion of the intermediate image corresponding to the defined region of the intermediate lens by applying at least one image processing operation included in the attributes of the intermediate lens;
a last lens for transforming, after the transformations by the intermediate lenses, a portion of the intermediate image corresponding to the defined region of the last lens by applying at least one image processing operation included in the attributes of the last lens, to produce the transformed image, wherein the defined regions of the first, intermediate, and last lenses selectively overlap one another in response to user specification in the attributes of the lenses;
a storage device including a database, coupled to the lens editing means, for storing in the database each lens along with its attributes for selective subsequent independent retrieval and modification in response to user'specification;
a user input device, coupled to the storage device and the database therein, and to the lens editing means, for accepting user specification of a selected number lenses, for accepting user specification of the attributes of the lenses, and for accepting user specification of modifications to stored lens attributes; and
an output device, coupled to the lens editing means, for outputting the transformed image.

27. The computer-implemented image processing system of claim 26, wherein the plurality of attributes of a lens stored in the storage device includes:
pixel data specification for the lens defining pixel data to be applied to a portion of the source image corresponding to the defined region of the lens; and
region blending specification defining a degree of blending between the pixel data and a subportion of the source image within the portion of the source image corresponding to the defined region.

28. The computer-implemented image processing system of claim 26, wherein the plurality of attributes of a lens stored in the storage device includes a region edge blending specification defining a degree of blending between a periphery of a first portion of the source image corresponding to the defined region and a second portion of the source image around the periphery of the first portion.

29. The computer-implemented image processing system of claim 26, wherein the plurality of attributes of a lens stored in the storage device includes an opacity spread definition defining an opacity spread area corresponding to a portion of the source image and an opacity-varying function, for controlling an image processing operation within the opacity spread area.

30. The computer-implemented image processing system of claim 26, wherein the plurality of attributes of a lens stored in the storage device includes a secondary mask definition defining a secondary region within which the image processing operations of selected lenses do not transform the source image.

31. A computer-implemented image processing method, comprising the steps of:
a) accepting input describing a source image;
b) defining at least one software object representing a lens, each lens having a plurality of attributes including a defined region corresponding to a portion of the source image and at least one image processing operation;
c) transforming a portion of the source image corresponding to the defined region of a first lens by applying at least one image processing operation included in the attributes of the first lens to the portion of the source image corresponding to the defined region of the first lens, to produce an intermediate image;
d) transforming, subsequent to the transformation by the first lens, a portion of the intermediate image corresponding to the defined region of an intermediate lens by applying at least one image processing operation included in the attributes of the intermediate lens to the portion of the intermediate image corresponding to the defined region of the intermediate lens;

e) selectively repeating substep (d) for any number of intermediate lenses, each transformation by an intermediate lens being subsequent to the transformation of a prior intermediate lens; and f) outputting the transformed image.

* * * * *